United States Patent
Itami et al.

[19]

[11] Patent Number: 6,150,779
[45] Date of Patent: Nov. 21, 2000

[54] MOTOR DRIVE APPARATUS AND METHOD

[75] Inventors: Yukio Itami; Mitsuo Suzuki, both of Yokohama, Japan

[73] Assignee: Ricoh Company, Ltd., Tokyo, Japan

[21] Appl. No.: 09/384,291

[22] Filed: Aug. 26, 1999

[30]     Foreign Application Priority Data

Aug. 26, 1998  [JP]  Japan ................................. 10-239726

[51] Int. Cl.[7] ................................. H02P 6/20; H02P 6/24
[52] U.S. Cl. ......................... 318/254; 318/430; 318/484; 318/721; 318/722; 318/724
[58] Field of Search ..................... 318/138, 254, 318/430, 431, 439, 445, 484, 700, 720, 721, 722, 724

[56]            References Cited

U.S. PATENT DOCUMENTS 4,733,159   3/1988   Edwards et al. ................. 323/282
5,377,641   1/1995   Salazar ................. 123/179.4
5,821,648  10/1998   Allinson ................. 310/68 B
5,892,340   4/1999   Sasajima et al. ................. 318/293

FOREIGN PATENT DOCUMENTS 6-6998   1/1994   Japan .

*Primary Examiner*—Bentsu Ro
*Attorney, Agent, or Firm*—Oblon, Spivak, McClelland, Maier & Neustadt, P.C.

[57]            ABSTRACT

A motor drive apparatus for driving a motor with power derived from a main power source, including a signal input device configured to input a start signal and a stop signal to initiate starting and stopping of the motor; a voltage regulator configured to output regulated electric power to the motor; and a semiconductor switching device disposed between the main power source and the voltage regulator, coupled to the signal input device, and configured to switch electric power from the main power source to the voltage regulator in accordance with the start signal input from the signal input device, and to shut off the electric power to the voltage regulator in accordance with the stop signal input from the signal input device.

15 Claims, 8 Drawing Sheets

MOTOR DRIVE APPARATUS AND METHOD

CROSS-REFERENCE TO RELATED APPLICATIONS

This application claims benefit of priority under 35 U.S.C. 119 from Japanese patent application No. 10-239726 filed in on Aug. 26, 1998, the entire contents of which are hereby incorporated by reference.

BACKGROUND OF THE INVENTION

1. Field of the Invention

The present invention relates to a motor drive apparatus, and more particularly relates to a motor drive apparatus and a method for reducing electric power consumption while in a stand-by state.

2. Discussion of the Background

In recent years, consciousness of environmental issues has been increasing. For example, demand for reduction in electric power consumption of an electric device, such as a household electrical appliance or an office machine, is increasing. In a lifetime of some electric devices, an aggregated amount of electric power consumption in a stand-by state exceeds the aggregated amount of electric power consumption in an operating state. Therefore, reduction in electric power consumption in the stand-by state of the electric device is important.

When an electric device including a motor is operating, a motor drive apparatus starts and stops the rotation of the motor, and controls the rotation speed thereof according to input signals. Many of these electric devices for convenience are desired to start an operation as soon as an operating command is input by an input device, such as a start button. Therefore, various devices installed in an electric device are supplied with electric power at all times, including when the electric product is in a stand by state, so that the electric device can swiftly start an operation when the start button is depressed.

However, when the electric device is in a stand-by state, the motor drive apparatus structured with semiconductor switching devices and the motor having position sensors are both provided electric power. Consequently, the motor drive apparatus and the motor waste a certain amount of electric power in the stand by state.

FIG. 1 is a schematic circuit diagram illustrating a structure of a motor drive apparatus 100 according to background art and a motor 10 driven by the driving apparatus 100. The motor 10 is a brushless direct current motor having three-phase field windings (hereinafter referred to as a DC motor). In FIG. 1, the DC motor 10 includes a rotor (not shown), Hall-effect devices "H1", "H2" and "H3" denoted by reference numerals 107, 108 and 109, respectively and field windings 110, 111 and 112. For each of the field windings 110, 111 and 112, a phase U winding is denoted with "U", a phase V winding with "V", and a phase W winding with "W". The Hall-effect devices "H1", "H2" and "H3" sense a rotating position of the rotor of the DC motor 10.

The motor drive apparatus 100 includes a power input terminal 101, a grounding input terminal 102, a start and stop signal input terminal 103, a motor control circuit 104, a current switching device 105, a voltage regulator 106, bias resisters 113 and 114 for the Hall-effect devices. The power input terminal 101 inputs electric power having a voltage Vcc relative to the grounding input terminal 102 supplied by a main power source 301 provided in an electric product 300. The voltage regulator 106 inputs the supplied voltage Vcc from an input terminal of the voltage regulator 106 and outputs a voltage Va, which is lower than the voltage Vcc. The voltage Va is supplied to the motor control circuit 104 and the Hall-effect devices 107, 108 and 109 of the DC motor 10 via the bias resisters 113 and 114 as a biasing voltage across the Hall-effect devices 107, 108 and 109.

The motor control circuit 104 includes a start/stop terminal, a speed control circuit (not shown), a position sensing circuit (not shown) for sensing a rotating position of the rotor of the DC motor 10 and a current switching control circuit (not shown). The current switching device 105 connects to the field windings 110, 111 and 112 of the DC motor 10 and the power source having the voltage Vcc. The current switching device 105 also connects to the motor control circuit 104 via resistors each denoted by "R" and transistors each denoted by "Q".

When the electric device 300 is turned on, the main power source 301 is turned on to supply power having voltage Vcc to the voltage regulator 106 and the current switching device 105 of the motor drive apparatus 100. Before the motor control circuit 104 receives a "start signal", i.e., when the electric device 300 is in a stand-by state, the voltage regulator 106 outputs and supplies a voltage Va to the other elements, such as the motor control circuit 104 of the motor drive apparatus 100 and the Hall-effect devices 107, 108 and 109 of the DC motor 10. During the stand-by time, the current switching device 105 does not energize the field windings 110, 111 and 112. However, a current generally flows through the motor control circuit 104, the bias resisters 113 and 114, and the Hall-effect devices 107, 108 and 109, and thereby a certain amount of electric power is consumed. The DC motor 10 and the motor drive apparatus 100 consume, for example, 500 mW to 2000 mW during the stand-by period.

When the motor control circuit 104 receives a "start signal" through the start and stop signal terminal 103, the motor control circuit 104 signals to the current switching device 105 to feed and switch the current running through the field windings 110, 111 and 112 in accordance with a position signal sensed by the Hall-effect devices 107, 108 and 109, such that the field windings 110, 111 and 112 generate a rotating magnetic field and thereby the rotor of the DC motor 10 is rotated.

The motor drive apparatus 100 has a drawback that the motor control circuit 104 is supplied with the voltage Va during the stand-by period, thereby a certain amount of electric power is consumed. In addition, the motor control circuit 104 can be affected by electrical noise, which may lead to a malfunction despite the fact that the electric device 300 is in a stand-by state. Further, during the stand-by period, once the Hall-effect device 107, 108 or 109 fails (e.g., once the device establishes a short-circuit) a large current may run through the current switching device 105 and the DC motor 10, and consequently safety might be impaired in addition to wasting a larger amount of electric power.

In order to decrease electric power consumption in the stand-by state, Japanese Laid-open Patent Publication No. 06006998 describes a brushless motor drive IC and a driving circuit which halt switching elements which drive the motor, except for a circuit for detecting whether the motor is rotating, when the apparatus is in the stand-by state. However, a motor control circuit and Hall-effect devices in the driving circuit are supplied with electric power during the stand-by state and these consume a certain amount of electric power.

SUMMARY OF THE INVENTION

Accordingly, an object of the present invention is to provide a novel motor drive apparatus and method for decreasing electric power consumption and increasing safety in a stand-by state.

Another object of the present invention is to provide a novel motor drive apparatus which operates a motor for a predetermined period of time after receiving a stop signal and decreases electric power consumption and increases safety in a stand-by state.

Yet another object of the present invention is to provide a novel motor drive apparatus which rapidly decreases a rotating speed of a motor to stop the motor.

Still another object of the present invention is to provide a novel motor drive apparatus which decreases damages to a dynamic air pressure bearing of a motor.

These and other objects are achieved according to the present invention by providing a novel motor drive apparatus for driving a motor with power derived from a main power source, including a signal input device configured to input a start signal and a stop signal to initiate starting and stopping of the motor; a voltage regulator configured to output secondary electric power to the motor; and a semiconductor switching device disposed between the main power source and the voltage regulator, coupled to the signal input device, and configured to switch electric power from the main power source to the voltage regulator in accordance with the start signal input from the signal input device, and to shut off the electric power to the voltage regulator in accordance with the stop signal input from the signal input device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
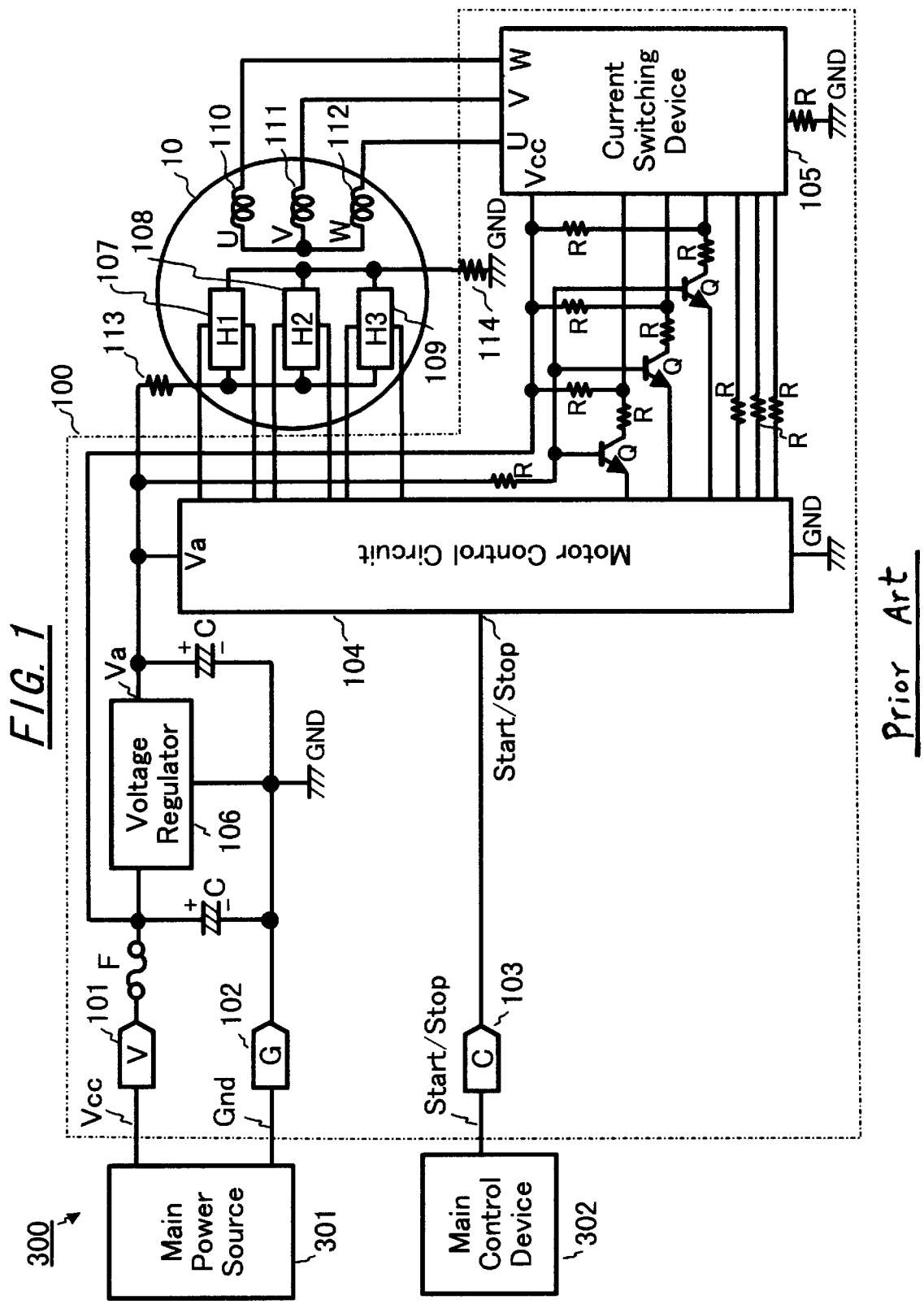
FIG. 1 is a schematic circuit diagram illustrating a structure of a motor drive apparatus according to a background art.

Motor drive apparatuses and methods according to embodiments of the present invention are now described referring to drawings, in which like reference numerals indicate identical or corresponding parts throughout the several views.

Figure 2:
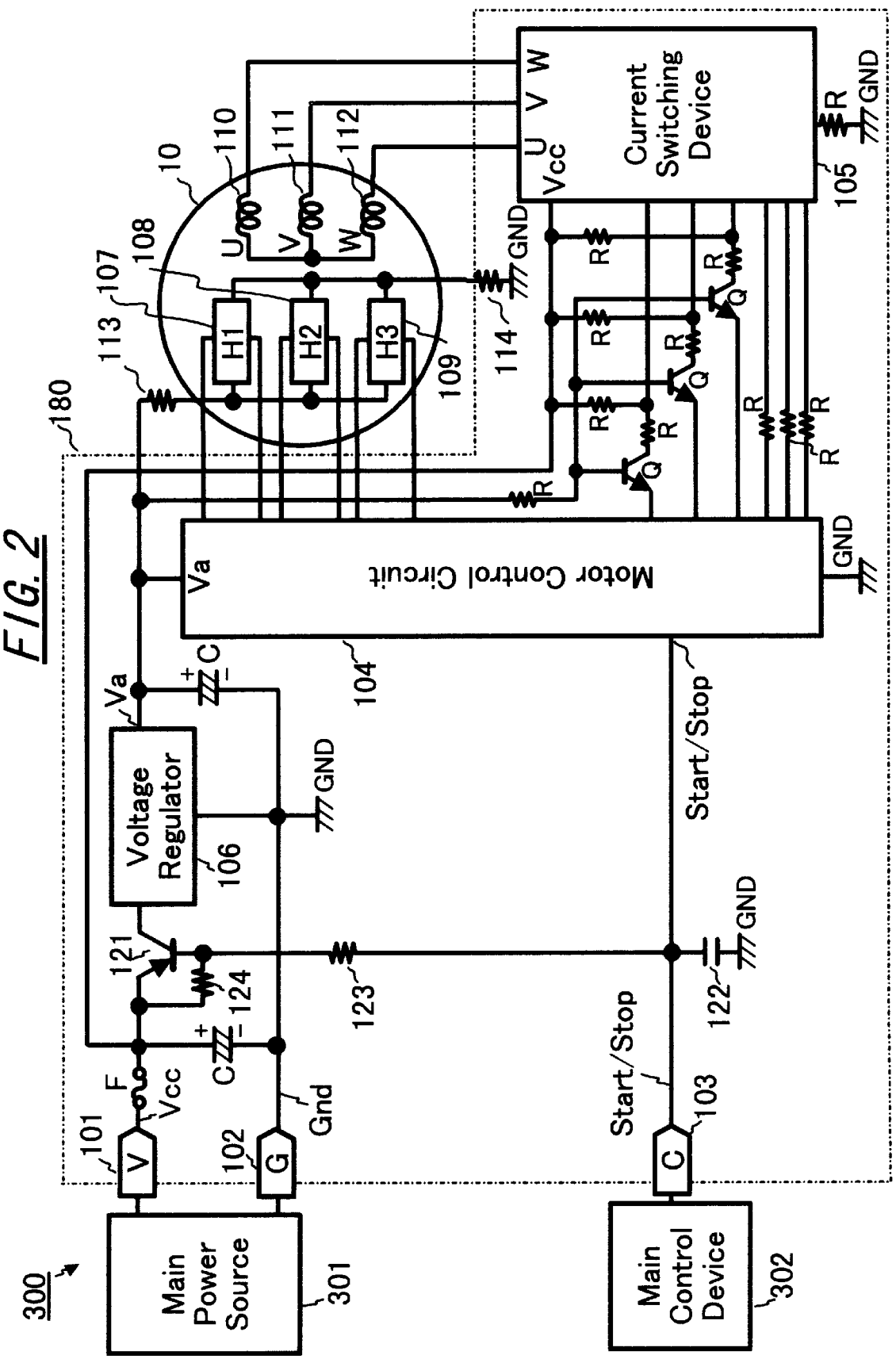
FIG. 2 is a schematic circuit diagram illustrating a structure of a motor drive apparatus according to a first embodiment of the present invention.

FIG. 2 is a schematic circuit diagram illustrating a structure of a motor drive apparatus 180 according to a first embodiment of the present invention. The motor drive apparatus 180 can drive various kinds of motors, for example, a brushless direct current motor 10 having three-phase field windings (hereinafter referred to as a DC motor) illustrated in FIG. 2. The DC motor 10 includes a rotor (not shown), Hall-effect devices "H1", "H2" and "H3" denoted by reference numerals 107, 108 and 109, respectively and field windings 110, 111 and 112. For each of the field windings 110, 111 and 112, a phase U winding is denoted with "U", a phase V winding with "V", and a phase W winding with "W". The Hall-effect devices "H1", "H2" and "H3" sense a rotating position of the rotor.

The motor drive apparatus 180 includes a power input terminal 101, a grounding input terminal 102, a start and stop signal input terminal 103, a motor control circuit 104, a current switching device 105, a voltage regulator 106, bias resisters 113 and 114 for the Hall-effect devices 107, 108 and 109, a first semiconductor switching device 121, a capacitor 122, a resistor 123 and a resistor 124. The first semiconductor switching device 121 can be a PNP bipolar transistor. The capacitor 122 and the resistor 123 filter out electrical noise and the resistor 124 biases the base of the PNP bipolar transistor 121 with a voltage.

The power input terminal 101 inputs electric power having a voltage Vcc relative to the grounding input terminal 102 supplied by a main power source 301 provided in an electric device 300. The first semiconductor switching device 121 is disposed between the power input terminal 101 and the voltage regulator 106. The first semiconductor switching device 121 functions as a power saving circuit while the motor drive apparatus 180 is in a stand-by state by switching the power supplied to the voltage regulator 106 off. On the other hand, when the electric device 300 is in an operation, the first semiconductor switching device 121 switches such that the voltage regulator 106 inputs the supplied voltage Vcc and outputs a voltage Va which is lower than the voltage Vcc. The output power Va is supplied to the motor control circuit 104 and the Hall-effect devices 107, 108 and 109 of the DC motor 10 via the bias resisters 113 and 114 as a biasing voltage across the Hall-effect devices 107, 108 and 109.

The start and stop signal input terminal 103 inputs start and stop signals from a main control device 302 of the electric device 300. The start and stop signal input terminal 103 connects to a start/stop terminal, which is denoted by "Start/Stop", of the motor control circuit 104 and the base of the PNP bipolar transistor 121 via the resistor 124. The start signal, which is input to the start and stop signal input terminal 103, has a lower voltage, for example, a voltage substantially equal to the ground voltage. Hereinafter, the start signal is referred to as "L". The stop signal to the start and stop signal input terminal 103 has a higher voltage, such as, for example, a voltage substantially equal to the voltage "Vcc". Hereinafter, the stop signal is referred to as "H".

The motor control circuit 104 includes the start/stop terminal 103, a speed control circuit (not shown), a position sensing circuit 116 for sensing a rotating position of the rotor of the DC motor 10 and a current switching control circuit (not shown). The current switching device 105 connects to the field windings 110, 111 and 112 of the DC motor 10 and the power source having the voltage Vcc. The current switching device 105 also connects to the motor control circuit 104 via resistors each denoted by "R" and transistors each denoted by "Q".

When the main switch of the electric device 300 is turned on, the electric device 300 enters a stand-by state and the main power source 301 is turned on to supply voltage Vcc to the emitter of the PNP bipolar transistor 121 and the current switching device 105 of the motor drive apparatus 180. A short time after the electric device 300 is turned on, the main control device 302 sends a stop signal "H" having a voltage substantially equal to the voltage "Vcc" to the start and stop signal input terminal 103. Accordingly, a control voltage for controlling the first semiconductor switching device 121, i.e., an applied electric potential to the ground of the base of the PNP bipolar transistor 121, becomes substantially equal to the voltage Vcc, which is applied to the emitter of the PNP bipolar transistor 121. Thereby, a current does not flow either from the emitter through the base of the PNP bipolar transistor 121, or from the emitter through the collector of the PNP bipolar transistor 121. Thus, the PNP bipolar transistor 121 is shut off.

Thus, the power supplied from the main power source 301 is not applied to the voltage regulator 106 while the device is in a stand-by state, and accordingly no power is supplied to the motor control circuit 104, the Hall-effect devices 107, 108 and 109 of the DC motor 10, or the bias resisters 113 and 114. That is, no power is consumed by the motor control circuit 104, the Hall-effect devices 107, 108 and 109, and the bias resisters 113 and 114 while the device is in a stand-by state, accordingly the aggregated amount of power consumed by the electric device 300 while in a stand-by state is reduced.

When the main control device 302 sends a start signal "L", having a lower voltage substantially equal to the ground voltage to the start and stop signal input terminal 103, the start signal "L" causes an electric potential of the base of the PNP bipolar transistor 121 to be lower than that of the emitter of the PNP bipolar transistor 121. Consequently, a base current flows from the emitter through the base of the PNP bipolar transistor 121 and a collector current flows from the emitter through the collector of the PNP bipolar transistor 121. Thus, PNP bipolar transistor 121 is turned on or becomes conductive so that the voltage Vcc is supplied to the voltage regulator 106.

When voltage Vcc is supplied to the voltage regulator 106, the voltage regulator 106 outputs and supplies the voltage Va, which is lower than the voltage Vcc, to the other elements such as the motor control circuit 104 of the motor drive apparatus 180 and the Hall-effect devices 107, 108 and 109 of the DC motor 10. When the start signal "L" having a voltage equal to the ground voltage inputs to the start and stop input terminal 103, the start signal "L" is also input to the start/stop terminal of the motor control circuit 104, the motor control circuit 104 is also supplied with the voltage Va which is lower than the voltage Vcc. In accordance with the start signal "L", the motor control circuit 104 signals to the current switching device 105 to feed and switch the current running through the field windings 110, 111 and 112 in accordance with a position signal sensed by the Hall-effect devices 107, 108 and 109, such that the field windings 110, 111 and 112 generate a rotating magnetic field and thereby the rotor of the DC motor 10 is rotated.

As described above, during the stand-by period, the voltage regulator 106, which supplies the power to the motor control circuit 104, the Hall-effect devices 107, 108 and 109 of the DC motor 10, and the bias resisters 113 and 114, are not supplied with power, and thereby no electric power is consumed in the above devices. In addition, during the stand-by period, the motor control circuit 104 is not supplied with power, thus, the motor control circuit 104 can not be affected by electrical noise which can lead to a malfunction. Thus, the reliability of the motor drive apparatus 180 in a stand-by state is increased. Further, during the stand-by period, even when one of the Hall-effect devices 107, 108 and 109 establishes a short-circuit because no current flows through the devices 107, 108 and 109, safety of the motor drive apparatus 180 in the stand-by state is increased.

Figure 3:
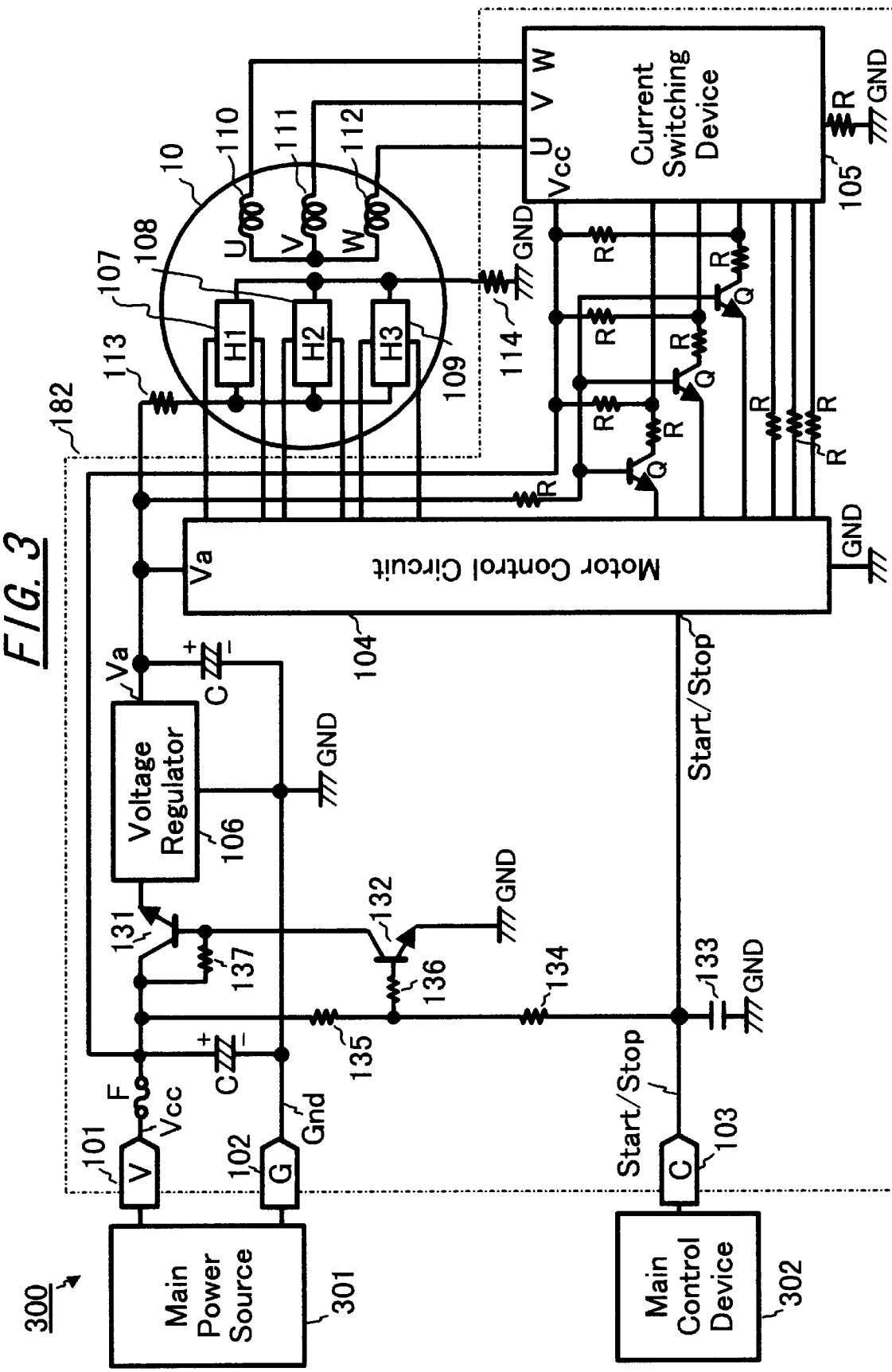
FIG. 3 is a schematic circuit diagram illustrating a structure of a motor drive apparatus according to a second embodiment of the present invention.

FIG. 3 is a schematic circuit diagram illustrating a structure of a motor drive apparatus 182 according to a second embodiment of the present invention. In FIG. 3, elements substantially the same as those in FIG. 2 are denoted by the same reference numerals. Referring to FIG. 3, the motor drive apparatus 182 drives a DC motor 10, which is substantially the same as the DC motor 10 illustrated in FIG. 2.

The motor drive apparatus 182 includes a power input terminal 101, a grounding input terminal 102, a start and stop signal input terminal 103, a motor control circuit 104, a current switching device 105, a voltage regulator 106, bias resisters 113 and 114 for the Hall-effect devices 107, 108 and 109, a first semiconductor switching device 131, a second semiconductor switching device 132, a capacitor 133, and resistors 134, 135, 136 and 137. The first semiconductor switching device 131 and the second semiconductor switching device 132 can be NPN bipolar transistors. The capacitor 133 and the resistor 134 filter out electrical noise. The resistors 135 and 136 divide the voltage Vcc into two appropriate voltages. The resistor 137 biases the base of the NPN bipolar transistor 131.

The power input terminal 101 inputs electric power having a voltage Vcc relative to the grounding input terminal 102 supplied by a main power source 301 provided in the electric device 300. The first semiconductor switching device 131 is disposed between the power input terminal 101 and the voltage regulator 106. The first semiconductor switching device 131, the second semiconductor switching device 132, the capacitor 133, and the resistors 134, 135, 136 and 137 function as a power saving circuit while the electric device 300 is in a stand-by state by switching power supplied to the voltage regulator 106 off. Alternatively, when the electric device 300 is in operation, the supplied voltage Vcc is input to the voltage regulator 106 from the first semiconductor switching device 131 and the voltage regulator 106 outputs a voltage Va, which is lower than the voltage Vcc. The voltage Va is supplied to the motor control circuit 104 and the Hall-effect devices 107, 108 and 109 of the DC motor 10 via the bias resisters 113 and 114 as a biasing voltage across the Hall-effect devices 107, 108 and 109.

The start and stop signal input terminal 103 inputs start and stop signals from a main control device 302 of the electric device 300. The start and stop signal input terminal 103 connects to a start/stop terminal, which is denoted by "Start/Stop", of the motor control circuit 104 and the base of the NPN bipolar transistor 132 via the resistors 134 and 136. The start signal, which is input to the start and stop signal input terminal 103, has a lower voltage, for example, a voltage substantially equal to the ground voltage. The start signal is referred to as "L". The stop signal has a higher voltage, for example, a voltage substantially equal to the voltage "Vcc". The stop signal is referred to as "H".

The motor control circuit 104 includes the start/stop terminal, a speed control circuit (not shown), a position sensing circuit (not shown) for sensing a rotating position of the rotor of the DC motor 10 and a current switching control circuit (not shown). The current switching device 105 connects to the field windings 110, 111 and 112 of the DC motor 10 and the power source having the voltage Vcc. The current switching device 105 also connects to the motor control circuit 104 via resistors each denoted by "R" and transistors each denoted by "Q".

When the main switch of the electric device 300 is turned on, the electric device 300 enters the stand-by state and the main power source 301 is turned on to supply voltage Vcc to the collector of the NPN bipolar transistor 131 and the current switching device 105 of the motor drive apparatus 182. After the electric device 300 enters a stand-by state, the main control device 302 sends a stop signal "H" having a voltage substantially equal to the voltage "Vcc" to the start and stop signal input terminal 103. Accordingly, an input voltage to the base of the NPN bipolar transistor 132 is increased to a higher voltage relative to the ground, and thereby a current flows from a base through the emitter of the NPN bipolar transistor 132, and thereby a larger current flows from the collector through the emitter of the NPN bipolar transistor 132. Accordingly, an input voltage to the base of the NPN bipolar transistor 131 becomes lower, and thereby a current does not flow either from the base through the emitter of the NPN bipolar transistor 131, or from the collector through the emitter of the NPN bipolar transistor 131. Thus, the NPN bipolar transistor 131 is shut off.

Thus, the power supplied from the main power source 301 is not applied to the voltage regulator 106 while the electric device 300 is in a stand-by state, and accordingly no power is supplied to the motor control circuit 104, the Hall-effect devices 107, 108 and 109 of the DC motor 10, or the bias resisters 113 and 114. Thus, no power is consumed by the motor control circuit 104, the Hall-effect devices 107, 108 and 109, and the bias resisters 113 and 114, and accordingly an aggregated amount of power consumed by the electric device 300 in the stand-by state is reduced. The resistors 135, 136 and 137 and the second semiconductor switching device 132 may consume a certain amount of electric power during the stand-by state. However, the power consumption can be limited to a relatively small quantity by setting the values of resistance of the resistors, 135, 136 and 137 to appropriately large values.

As described above, in the second embodiment, a PNP bipolar transistor is used as the first semiconductor switching device 131, however, another type of current control switching devices may be used. Also, a voltage control switching device, such as a field effect transistor, can be used as the first semiconductor switching device 131, so that power consumption of the resistor 137 in a stand-by period can be further decreased. Likewise, the second semiconductor switching device 132 can be replaced by a voltage control switching device for further reducing power consumption in the stand-by period.

When the main control device 302 sends the start signal "L," having the lower voltage substantially equal to the ground voltage, to the start and stop signal input terminal 103, the start signal "L" causes an electric potential at the base of the NPN bipolar transistor 132 to be low as the ground voltage, and thereby the NPN bipolar transistor 132 shuts off. Consequently, a collector voltage of the NPN bipolar transistor 132, i.e., a base voltage of the NPN bipolar transistor 131, becomes close to the voltage Vcc, and a base current flows from the base through the emitter of the NPN bipolar transistor 131. Thereby, a collector current flows from the collector through the emitter of the NPN bipolar transistor 131. Thus, the NPN bipolar transistor 131 is turned on or becomes conductive such that the voltage Vcc is supplied to the voltage regulator 106.

When the voltage Vcc is supplied to the voltage regulator 106, the voltage regulator 106 outputs the voltage Va, which is lower than the voltage Vcc, to the other elements such as the motor control circuit 104 of the motor drive apparatus 182 and the Hall-effect devices 107, 108 and 109 of the DC motor 10. When the start signal "L" having a lower voltage inputs to the start and stop input terminal 103, the start signal "L" is also input to the start/stop terminal of the motor control circuit 104, the motor control circuit 104 is also supplied with the voltage Va as well. In accordance with the start signal "L", the motor control circuit 104 signals to the current switching device 105 to feed and switch the current running through the field windings 110, 111 and 112 in accordance with a position signal sensed by the Hall-effect devices 107, 108 and 109, such that the field windings 110, 111 and 112 generate a rotating magnetic field and thereby the rotor of the DC motor 10 is rotated.

As described above, during the stand-by period, the voltage regulator 106, which supplies the power to the motor control circuit 104, the Hall-effect devices 107, 108 and 109 of the DC motor 10, and the bias resisters 113 and 114, are not supplied with power, and thereby no electric power is consumed in the above devices. In addition, during the stand-by period, the motor control circuit 104 is not supplied with power, thus the motor control circuit 104 can not be affected by electrical noise which can lead to a malfunction. Thus, the reliability of the motor drive apparatus 182 in a stand-by state is increased. Further, during the stand-by period, even when one of the Hall-effect devices 107, 108 and 109 establishes a short-circuit because no current flows through the devices 107, 108 and 109, safety of the motor drive apparatus 182 in the stand-by state is increased.

Figure 4:
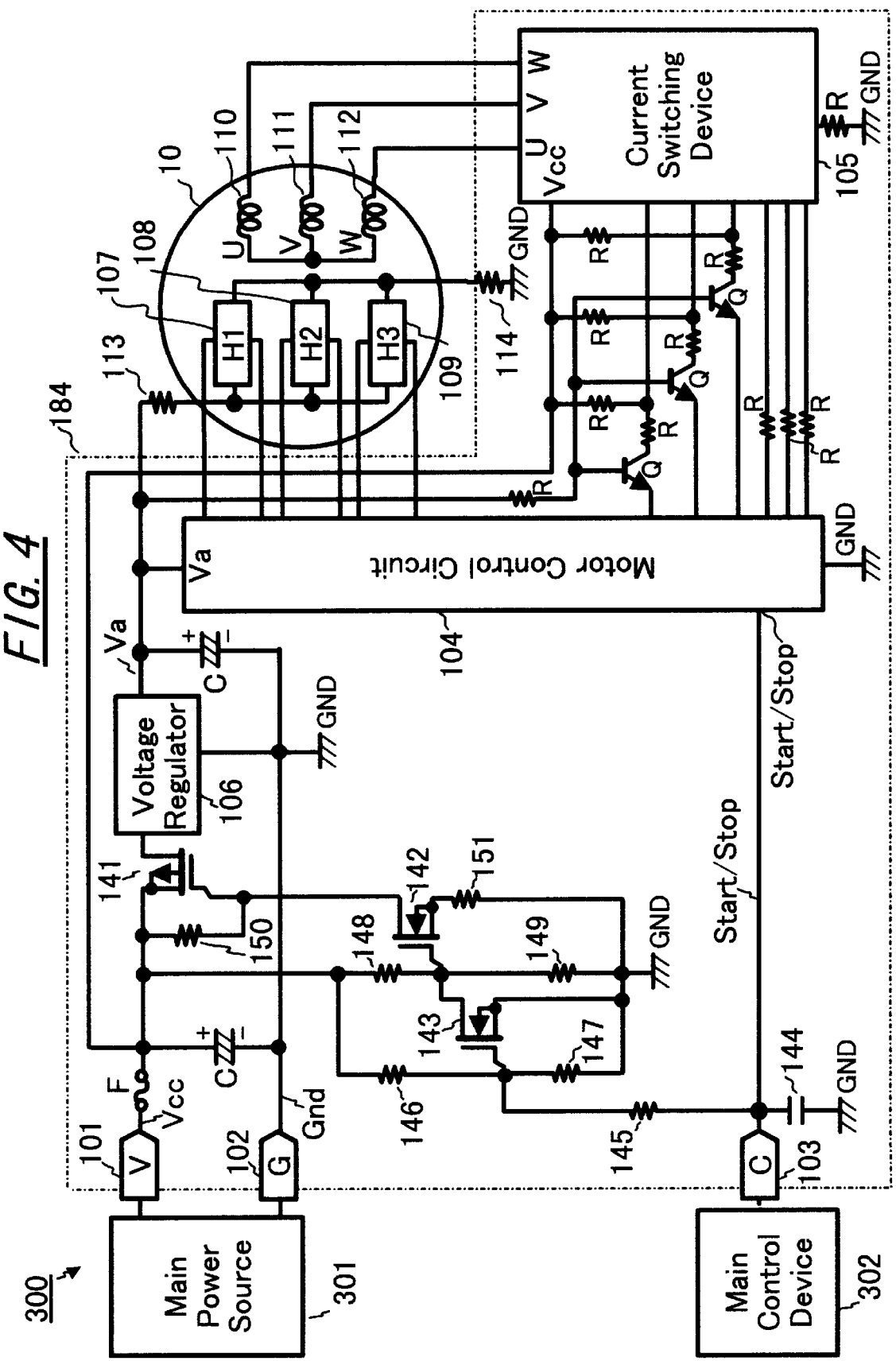
FIG. 4 is a schematic circuit diagram illustrating a structure of a motor drive apparatus according to a third embodiment of the present invention.

FIG. 4 is a schematic circuit diagram illustrating a structure of a motor drive apparatus 184 according to a third embodiment of the present invention. In FIG. 4, elements substantially the same as those in FIG. 2 are denoted by the same reference numerals. Referring to FIG. 4, the motor drive apparatus 184 drives a DC motor 10, which is substantially the same as the DC motor 10 illustrated in FIG. 2.

The motor drive apparatus 184 includes a power input terminal 101, a grounding input terminal 102, a start and stop signal input terminal 103, a motor control circuit 104, a current switching device 105, a voltage regulator 106, bias resisters 113 and 114 for the Hall-effect devices 107, 108 and 109, a first semiconductor switching device 141, a second semiconductor switching device 142, a third semiconductor switching device 143, a capacitor 144, and resistors 145, 146, 147, 148, 149, 150 and 151.

The first semiconductor switching device 141 can be a P-channel metal oxide semiconductor field effect transistor (hereinafter referred to as a P-channel MOS FET), the second semiconductor switching device 142 and the third semiconductor switching device 143 can be N-channel metal oxide semiconductor field effect transistors, respectively (hereinafter referred to as N-channel MOS FETs). The capacitor 144 and the resistor 145 filter out electrical noise. A pair of the resistors 146 and 147 divide the voltage Vcc into two voltages and biases the gate of the N-channel MOS FET 143 with one of the divided voltage. Resistors 148 and 149 divide the voltage Vcc into two voltages and biases the gate of the N-channel MOS FET 142 with the divided voltage. When the N-channel MOS FET 142 is turned on, a pair of the resistors 150 and 151 divide the voltage Vcc into two voltages and biases the gate of a P-channel MOS FET 141 with one of the divided voltages.

The power input terminal 101 inputs electric power having a voltage Vcc relative to the grounding input terminal 102 supplied by a main power source 301 provided in the electric device 300. The first semiconductor switching device 131 is disposed between the power input terminal 101 and the voltage regulator 106. The first semiconductor switching device 141, the second semiconductor switching device 142, the third semiconductor switching device 143, the capacitor 144, and the resistors 145, 146, 147, 148, 149, 150 and 151 function as a power saving circuit while the electric device 300 is in a stand-by state by shutting off power to the voltage regulator 106. Alternatively, when the electric device 300 is in operation, the supplied voltage Vcc is input to the voltage regulator 106 from the first semiconductor switching device 141 and the voltage regulator 106 outputs a voltage Va, which is lower than the voltage Vcc. The voltage Va is supplied to the motor control circuit 104 and the Hall-effect devices 107, 108 and 109 of the DC motor 10 via the bias resisters 113 and 114 as a biasing voltage across the Hall-effect devices 107, 108 and 109.

The start and stop signal input terminal 103 inputs start and stop signals from a main control device 302 of the electric device 300. The start and stop signal input terminal 103 connects to a start/stop terminal, which is denoted by "Start/Stop", of the motor control circuit 104 and the gate of the N-channel MOS FET 143 via the resistor 145. The start signal, which is input to the start and stop signal input terminal 103, has a lower voltage, for example, a voltage substantially equal to the ground voltage. The start signal is referred to as "L". The stop signal has a higher voltage, for example, a voltage substantially equal to the voltage "Vcc". The stop signal is referred to as "H".

The motor control circuit 104 includes a start/stop terminal, a speed control circuit (not shown), a position sensing circuit (not shown) for sensing a rotating position of the rotor of the DC motor 10 and a current switching control circuit (not shown). The current switching device 105 connects to the field windings 110, 111 and 112 of the DC motor 10 and the power source having the voltage Vcc. The current switching device 105 also connects to the motor control circuit 104 via resistors each denoted by "R" and transistors each denoted by "Q".

When the main switch of the electric device 300 is turned on, the electric device 300 enters a stand-by state and the main power source 301 is turned on to supply voltage Vcc to the source of the P-channel MOS FET 141 and the current switching device 105 of the motor drive apparatus 184. After the electric device 300 enters the stand-by state, the main control device 302 sends a stop signal "H" having a higher voltage than the start signal to the start and stop signal input terminal 103. Accordingly, an input voltage to the gate of the N-channel MOS FET 143 is increased to a higher voltage relative to the ground, and thereby the N-channel MOS FET 143 is turned on. Accordingly, an input voltage to the gate of the N-channel MOS FET 142 is decreased to close to the ground voltage, and thereby the N-channel MOS FET 142 is turned off. Accordingly, an input voltage to the gate of the P-channel MOS FET 141 changes to a voltage close to the voltage Vcc, and thereby the P-channel MOS FET 141 is turned off.

Thus, the power supplied from the main power source 301 is not applied to the voltage regulator 106 during the stand-by period, and accordingly no power is supplied to the motor control circuit 104, the Hall-effect devices 107, 108 and 109 of the DC motor 10, or the bias resisters 113 and 114. The resistors 146, 147 and 148 and the N-channel MOS FET 143 may consume a certain amount of electric power. However, the power consumption can be limited to a relatively small quantity by setting the values of resistance of the resistors 146, 147 and 148 to appropriately large values.

When the main control device 302 sends a start signal "L" to the start and stop signal input terminal 103, the start signal "L" causes an electric potential of the gate of the N-channel MOS FET 143 changes to a voltage close to the ground voltage, and thereby the N-channel MOS FET 143 is turned off. Consequently, a gate voltage of the N-channel MOS FET 142 is increased to a higher voltage relative to the ground, and thereby the N-channel MOS FET 142 is turned on. Accordingly, the input voltage to the gate of the P-channel MOS FET 141 becomes lower relative to the voltage Vcc, and thereby the P-channel MOS FET 141 is turned on. Thus, the voltage Vcc is supplied to the voltage regulator 106.

When the voltage Vcc is supplied to the voltage regulator 106, the voltage regulator 106 outputs the voltage Va, which is lower than the voltage Vcc, to the other elements such as the motor control circuit 104 of the motor drive apparatus 184 and the Hall-effect devices 107, 108 and 109 of the DC motor 10. When the start signal "L" having a lower voltage inputs to the start and stop input terminal 103, the start signal "L" is also input to the start/stop terminal of the motor control circuit 104, the motor control circuit 104 is also supplied with the voltage Va as well. In accordance with the start signal "L", the motor control circuit 104 signals to the current switching device 105 to feed and switch the current running through the field windings 110, 111 and 112 in accordance with a position signal sensed by the Hall-effect devices 107, 108 and 109, such that the field windings 110, 111 and 112 generate a rotating magnetic field and thereby the rotor of the DC motor 10 is rotated.

As described above, during the stand-by period, the voltage regulator 106, which supplies the power to the motor control circuit 104, the Hall-effect devices 107, 108 and 109 of the DC motor 10 and the bias resisters 113 and 114, are not supplied with power, and thereby no electric power is consumed in the above devices. In addition, during the stand-by period, the motor control circuit 104 is not supplied with power, thus the motor control circuit 104 can not be affected by electrical noise which can lead to a malfunction. Thus, the reliability of the motor drive apparatus 184 in a stand-by state is increased. Further, during the stand-by period, even when one of the Hall-effect devices 107, 108 and 109 establishes a short-circuit because no current flows through the devices 107, 108 and 109, safety of the motor drive apparatus 184 in the stand-by state is increased.

Figure 5:
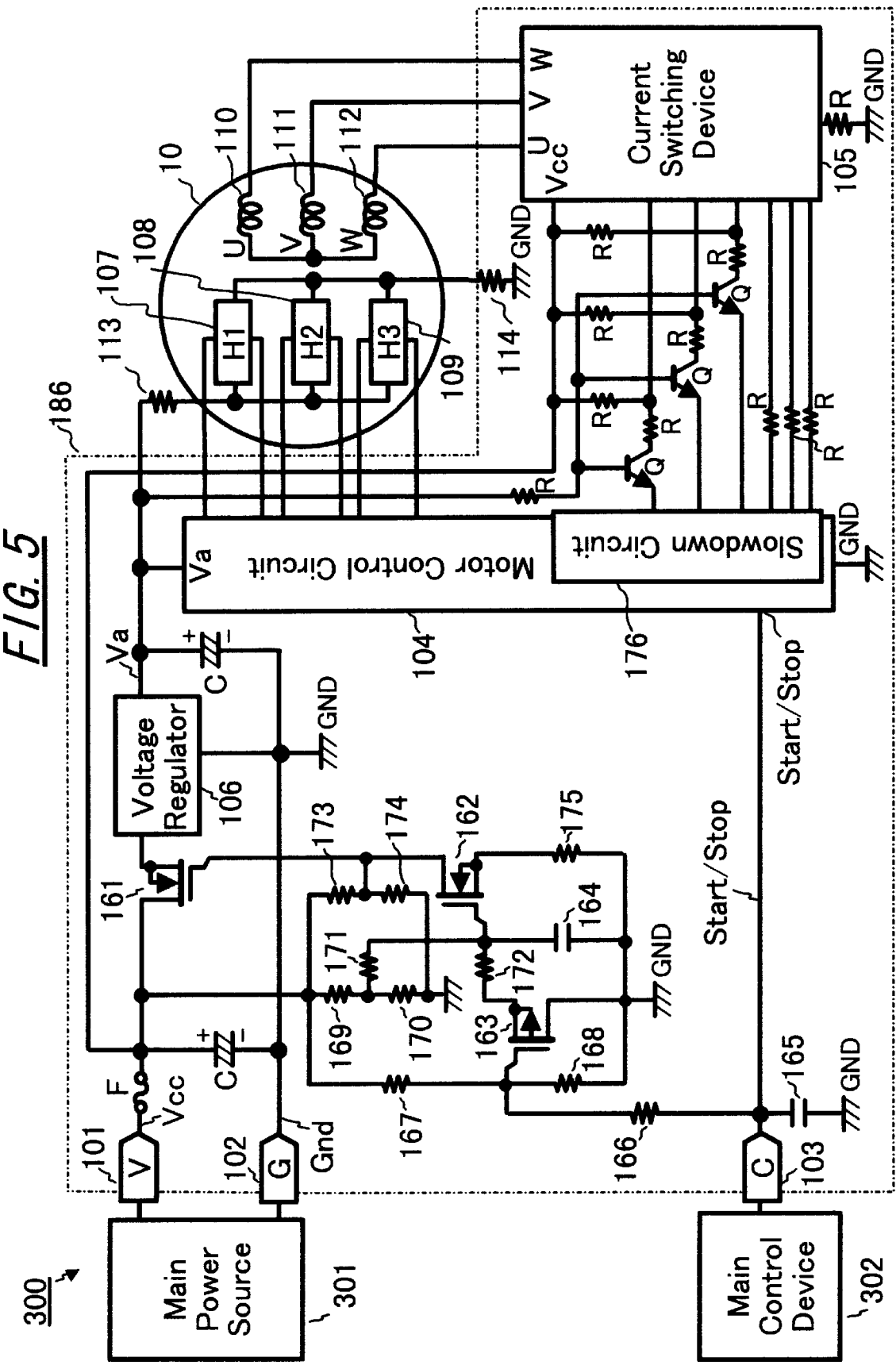
FIG. 5 is a schematic circuit diagram illustrating a structure of a motor drive apparatus according to a fourth embodiment of the present invention.

FIG. 5 is a schematic circuit diagram illustrating a structure of a motor drive apparatus 186 according to a fourth embodiment of the present invention. In FIG. 5, elements substantially the same as those in FIG. 2 are denoted by the same reference numerals. Referring to FIG. 5, the motor drive apparatus 186 drives a DC motor 10, which is substantially the same as the DC motor 10 illustrated in FIG. 2.

The motor drive apparatus 186 includes a power input terminal 101, a grounding input terminal 102, a start and stop signal input terminal 103, a motor control circuit 104, a current switching device 105, a voltage regulator 106, bias resisters 113 and 114 for the Hall-effect devices 107, 108 and 109, a first semiconductor switching device 161, a second semiconductor switching device 162, a third semiconductor switching device 163, capacitors 164 and 165, and resistors 166, 167, 168, 169, 170, 171, 172, 173, 174 and 175.

Figure 6:
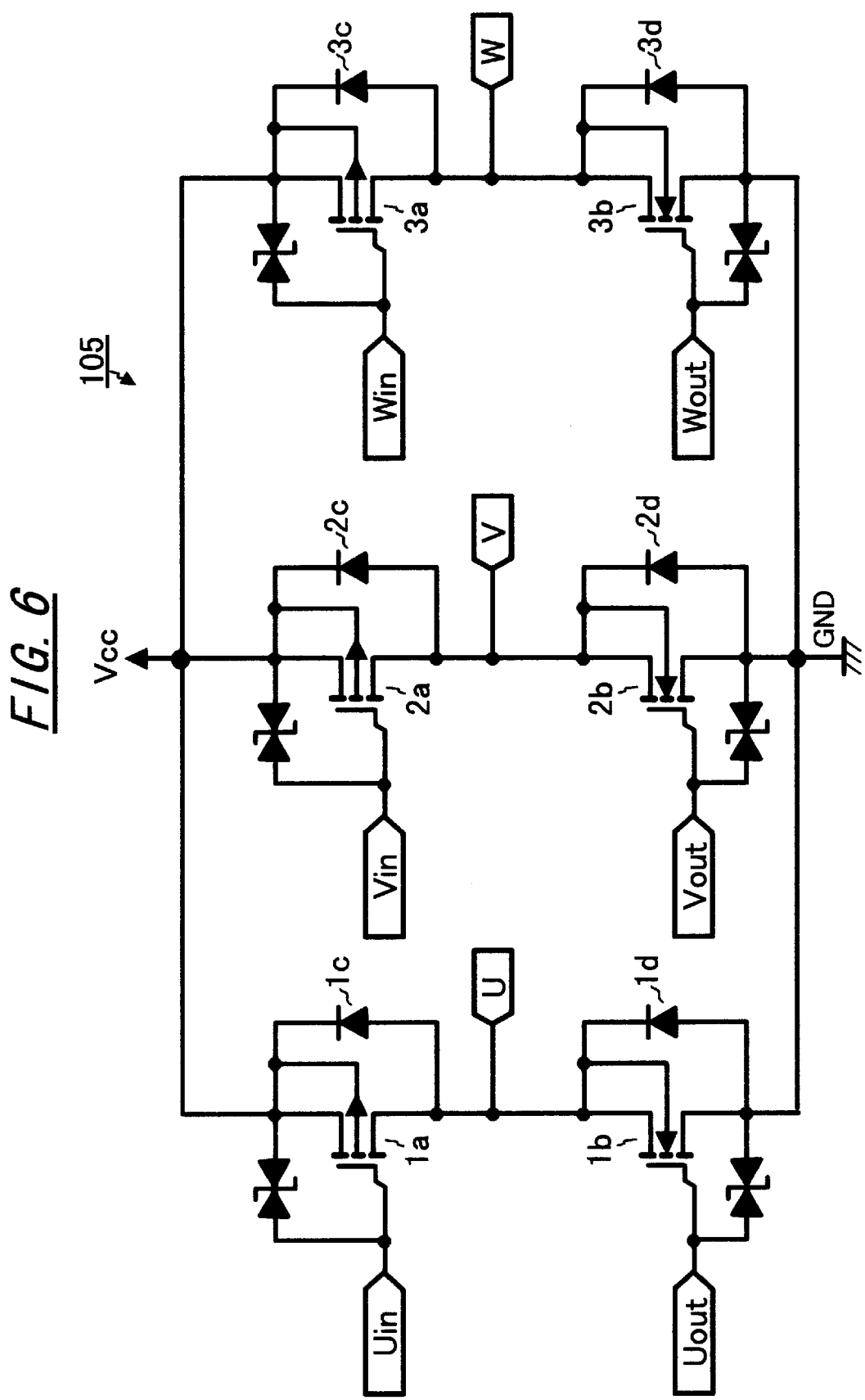
FIG. 6 is a schematic circuit diagram illustrating a structure of a current switching device of the motor drive apparatus of FIG. 5.

FIG. 6 is a schematic circuit diagram illustrating a structure of the current switching device 105 of the motor drive apparatus 186 of FIG. 5. In FIG. 6, the current switching device 105 includes three pairs of power switching devices 1a and 1b, 2a and 2b, and 3a and 3b, a power input terminal denoted by "Vcc", a grounding terminal denoted by "GND", three pairs of terminals each denoted by "Uin" and "Uout", "Vin" and "Vout", and "Win" and "Wout", three power output terminals each denoted by "U", "V" and "W". The power switching devices 1a, 2a and 3a are structured by P-channel MOS FETs and the power switching devices 1b, 2b and 3b are structured by N-channel MOS FETs. The power switching devices 1a, 1b, 2a, 2b, 3a and 3b have diodes 1c, 1d, 2c, 2d, 3c and 3d between the source and the drain thereof, respectively. Each of the diodes 1c, 1d, 2c, 2d, 3c and 3d allows a current to run through the diode in a reverse direction relative to a current running through each of the power switching devices. The power input terminal "Vcc" connects to the power source having the voltage Vcc and the grounding terminal "GND" is grounded. The three pairs of terminals "Uin" and "Uout", "Vin" and "Vout", and "Win" and "Wout" connect to the motor control circuit 104 via resistors each denoted by "R" and transistors each denoted by "Q" in FIG. 5. The power output terminals "U", "V" and "W" connect to the field windings 110, 111 and 112 of the DC motor 10 in FIG. 5, respectively.

Referring back to FIG. 5, the motor control circuit 104 includes a start/stop terminal, a slowdown circuit 176, a speed control circuit (not shown), a position sensing circuit (not shown) for sensing a rotating position of the rotor of the DC motor 10 and a current switching control circuit (not shown). With reference to FIG. 5 and FIG. 6, when the DC motor 10 is rotating and a stop signal is input to the start/stop terminal denoted by "start/stop" of the motor control circuit 104, the motor control circuit 104 signals to the current switching device 105 such that the three P-channel MOS FETs 1a, 2a and 3a connecting to the power input terminal "Vcc" turn off and the three N-channel MOS FETs 1b, 2b and 3b connecting to the grounding terminal "GND" turn on. Consequently, current running through the field windings 110, 111 and 112 changes the current path to a new path connecting through the diodes 1c, 2c and 3c, and the N-channel MOS FETs 1b, 2b and 3b, and therefore the current rapidly decreases. The above described operation of the current switching device 105 rapidly decreases the rotation of the DC motor 10, and the operation is generally referred to as a regenerative brake operation.

In FIG. 5, the first semiconductor switching device 161 and the second semiconductor switching device 162 can be N-channel metal oxide semiconductor field effect transistors (N-channel MOS FETS). The third semiconductor switching device 163 can be a P-channel metal oxide semiconductor field effect transistor (P-channel MOS FET). The resistor 171 feeds a current for charging the capacitor 164. The third semiconductor switching device 163 and the resistor 172 conduct a current for discharging the capacitor 164.

The power input terminal 101 inputs electric power having a voltage Vcc relative to the grounding input terminal 102 supplied by a main power source 301 provided in an electric device 300. The first semiconductor switching device 161 is disposed between the power input terminal 101 and the voltage regulator 106. The first semiconductor switching device 161, the second semiconductor switching device 162, the third semiconductor switching device 163, the capacitors 164 and 165, and the resistors 166, 167, 168, 169, 170, 171, 172, 173, 174 and 175 function as a power saving circuit while the electric device 300 is in a stand-by state by shutting off power supplied to the voltage regulator 106. Alternatively, when the electric device 300 is in operation, the supplied voltage Vcc is supplied to the voltage regulator 106 from the first semiconductor switching device 161 and the voltage regulator 106 outputs a voltage Va, which is lower than the voltage Vcc. The voltage Va is supplied to the motor control circuit 104 and the Hall-effect devices 107, 108 and 109 of the DC motor 10 via the bias resisters 113 and 114 as a biasing voltage across the Hall-effect devices 107, 108 and 109.

The start and stop signal input terminal 103 inputs start and stop signals from a main control device 302 of the electric device 300. The start and stop signal input terminal 103 connects to the start/stop terminal of the motor control circuit 104 and the gate of the P-channel MOS FET 163 via the resistor 166. The start signal, which is input to the start and stop signal input terminal 103, has a lower voltage, for example, a voltage substantially equal to the ground voltage. The start signal is referred to as "L". The stop signal has a higher voltage, for example, a voltage substantially equal to the voltage "Vcc".

When the main switch of the electric device 300 is turned on, the electric device 300 enters a stand-by state and the main power source 301 is turned on to supply voltage Vcc to the drain of the N-channel MOS FET 161 and the current switching device 105 of the motor drive apparatus 186. In addition, the main control device 302 sends a stop signal "H" having a higher voltage than the start signal, to the start and stop signal input terminal 103. Immediately after the electric device 300 is turned on, the capacitor 164 is not yet charged, thus, an input voltage input to the gate of the N-channel MOS FET 162 changes to a voltage close to the ground voltage, and thereby the N-channel MOS FET 162 is turned off. Accordingly, an input voltage to the gate of the N-channel MOS FET 161 is a higher voltage relative to the ground, and thereby the N-channel MOS FET 161 is turned on. Accordingly, the voltage regulator 106 inputs the supplied voltage Vcc and outputs a voltage Va to the motor control circuit 104 and the Hall-effect devices 107, 108 and 109 of the DC motor 10 via the bias resisters 113 and 114 as a biasing voltage across the Hall-effect devices 107, 108 and 109. At this time, the start/stop terminal of the motor control circuit 104 also inputs the stop signal "H", and accordingly the DC motor 10 does not rotate even when supplied with power.

In the special case, for example, when electric power to the electric device 300 is lost during operation and is returned a short time thereafter, the DC motor 10 may be rotating under its own inertia. On such occasion, the slowdown circuit 176 reduces the rotation speed of the DC motor 10 to a stop.

While in a stand-by state, the stop signal "H" inputs to the gate of the P-channel MOS FET 163, thereby the P-channel MOS FET 163 is turned off. When the P-channel MOS FET 163 is turned off, a current running through the resistor 171 gradually charges the capacitor 164. Accordingly, the input voltage to the gate of the N-channel MOS FET 162 gradually changes to a voltage close to the voltage Vcc, and thereby the N-channel MOS FET 162 is turned on. Accordingly, the input voltage to the gate of the N-channel MOS FET 161 changes to a voltage close to the ground voltage, and thereby the N-channel MOS FET 161 is turned off.

Thus, the power supplied from the main power source 301 is not applied to the voltage regulator 106 during the stand-by period, and accordingly no power is supplied to either the motor control circuit 104, the Hall-effect devices 107, 108 and 109 of the DC motor 10, or the bias resisters 113 and 114. The resistor 173 and the N-channel MOS FET 162 may consume a certain amount of electric power. However, the power consumption can be limited to a relatively small quantity, for example, to ¹/₁₀₀ of the power consumption of the motor drive apparatus in FIG. 1 of the background art, by setting the values of resistance of the resistor 173 to a large value.

When the main control device 302 sends a start signal "L" to the start and stop signal input terminal 103, the start signal "L" causes an electric potential of the gate of the p-channel MOS FET 163 to change to a voltage close to the ground voltage, and thereby the P-channel MOS FET 163 is turned on. Consequently, the electric charge in the capacitor 164 causes a current to run through the resistor 172 and the p-channel MOS FET 163, and thus the capacitor 164 is discharged. The resistance of the resistor 172 and the p-channel MOS FET 163 is small so that the discharging of the capacitor 164 is completed in a short time. Consequently, a gate voltage of the N-channel MOS FET 162 changes to a voltage close to the ground voltage, and thereby the N-channel MOS FET 162 is turned off. Accordingly, the input voltage to the gate of the N-channel MOS FET 161 changes to a voltage close to the voltage Vcc, and thereby the N-channel MOS FET 161 is turned on. Thus, the voltage Vcc is supplied to the voltage regulator 106.

When the voltage Vcc is supplied to the voltage regulator 106, the voltage regulator 106 outputs the voltage Va, which is lower than the voltage Vcc, to the other elements such as the motor control circuit 104 of the motor drive apparatus 186 and the Hall-effect devices 107, 108 and 109 of the DC motor 10. When the start signal "L" having a lower voltage inputs to the start and stop input terminal 103, the start signal "L" is also input to the start/stop terminal of the motor control circuit 104, the motor control circuit 104 is supplied with the voltage Va as well. In accordance with the start signal "L", the motor control circuit 104 signals to the current switching device 105 to feed and switch the current running through the field windings 110, 111 and 112 in accordance with a position signal sensed by the Hall-effect devices 107, 108 and 109, such that the field windings 110, 111 and 112 generate a rotating magnetic field and thereby the rotor of the DC motor 10 is rotated.

When the main control device 302 sends a stop signal "H" to the start and stop signal input terminal 103, the stop signal "H" causes the slowdown circuit 176 to reduce the rotating speed of the DC motor 10 in order to stop of the rotation of the DC motor 10. The stop signal "H" also causes an electric potential of the gate of the p-channel MOS FET 163 to change to a voltage close to the voltage Vcc, and thereby the P-channel MOS FET 163 is turned off. When the P-channel MOS FET 163 is turned off, a current through the resistor 171 gradually charges the capacitor 164. Accordingly, the input voltage to the gate of the N-channel MOS FET 162 gradually changes to a voltage close to the voltage Vcc. When the input voltage to the gate of the N-channel MOS FET 162 reaches a voltage close to the voltage Vcc, the N-channel MOS FET 162 is turned on. When the N-channel MOS FET 162 is turned on, the input voltage to the gate of the N-channel MOS FET 161 changes to a voltage close to the ground voltage, and thereby the N-channel MOS FET 161 is turned off. Accordingly, the power supplied from the main power source 301 is not applied to the voltage regulator 106 during the stand-by period, and no power is supplied to either the motor control circuit 104, the Hall-effect devices 107, 108 and 109 of the DC motor 10, or the bias resisters 113 and 114.

As described above, in this embodiment, the voltage regulator 106 continuously supplies the voltage Va for a predetermined time, i.e., the charging time of the capacitor 164 after receiving the stop signal "H". The charging time of the capacitor 164 is determined as a function of the resistance of the resistor 171 and the capacitance of the capacitor 164. The charging time is set according to the stopping characteristic of the DC motor 10, for example, the charging time is set to be a little longer than a time corresponding to a time from receiving the stop signal "H" to a time where the DC motor 10 is stopped. Therefore, the DC motor 10 is stopped a short time after receiving the stop signal "H".

As described above, during the stand-by period, the voltage regulator 106, which supplies the power to the motor control circuit 104, the Hall-effect devices 107, 108 and 109 of the DC motor 10, and the bias resisters 113 and 114, are not supplied with power, and thus no electric power is consumed in the above devices. In addition, during the stand-by period, the motor control circuit 104 is not supplied with power, thus, the motor control circuit 104 can not be affected by electrical noise which can lead to a malfunction. Thus, the reliability of the motor drive apparatus 186 in a stand-by state is increased. Further, during the stand-by period, even when one of the Hall-effect devices 107, 108 and 109 establishes a short-circuit because no current flows through the devices 107, 108 and 109, safety of the motor drive apparatus 186 in the stand-by condition is increased.

A motor having a rotor supported with a dynamic air pressure bearing is often used for a polygonal mirror scanner. The dynamic air pressure of the bearing is substantially proportional to a rotation speed of the rotor. When the rotation speed of a rotor of the motor is relatively slow and the dynamic air pressure of the bearing is not high, i.e., the force for floating the rotor is not large, a sleeve of the bearing and a journal of the rotor may rub against each other by an external disturbance force. The motor drive apparatus 186 includes a slowdown circuit 176 which is supplied with power for a predetermined time after receiving the stop signal input, thereby the DC motor 10 promptly stops after the stop signal is received. That is, a time period where air pressure or another force floating the rotor is short, thus, the opportunity to prove that the dynamic air pressure bearing is damaged by the external disturbance force is decreased.

Figure 7:
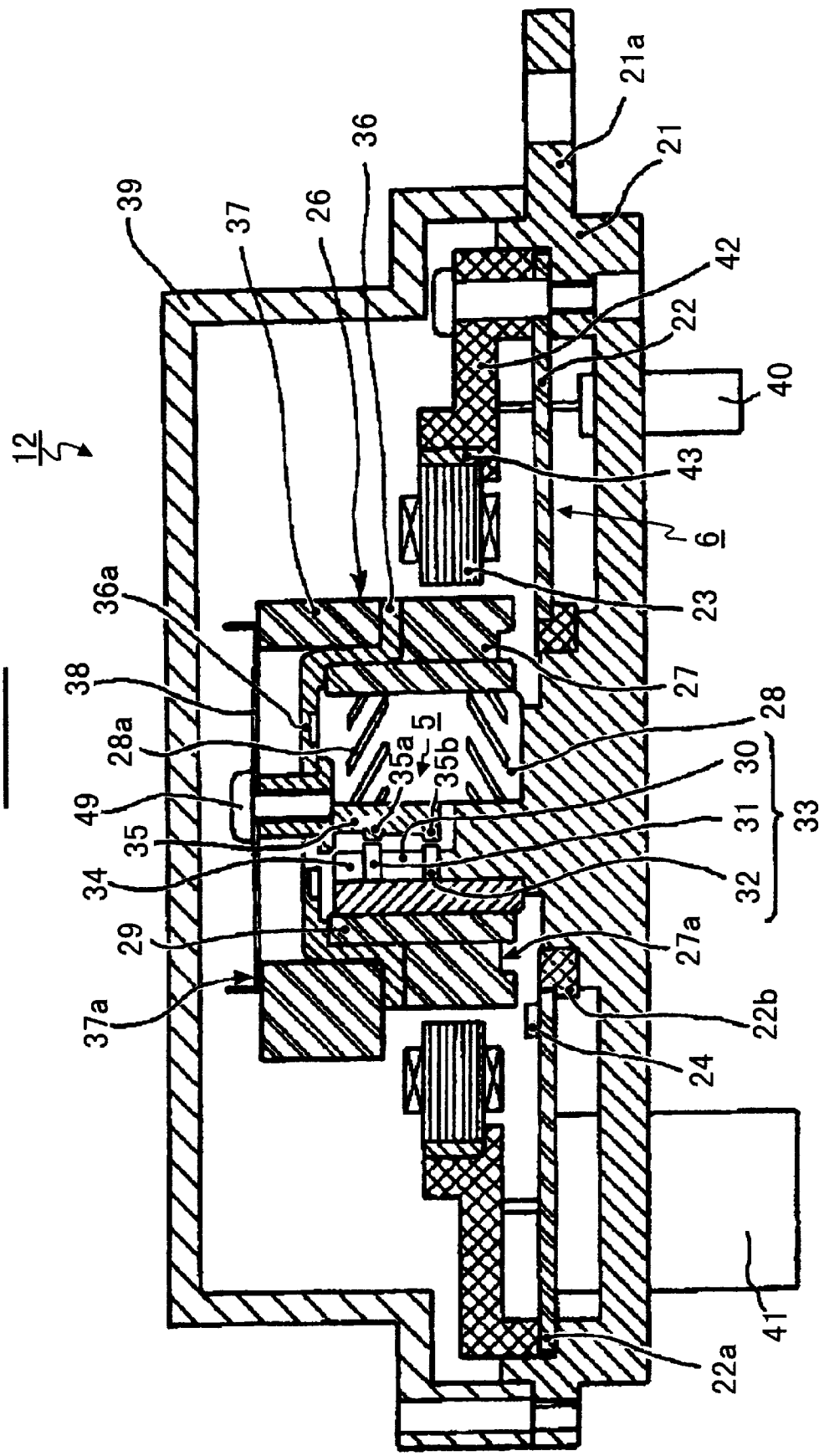
FIG. 7 is a schematic cross section view illustrating a structure of a motor drive apparatus for a polygonal mirror scanner motor according to an embodiment of the present invention.
Figure 8:
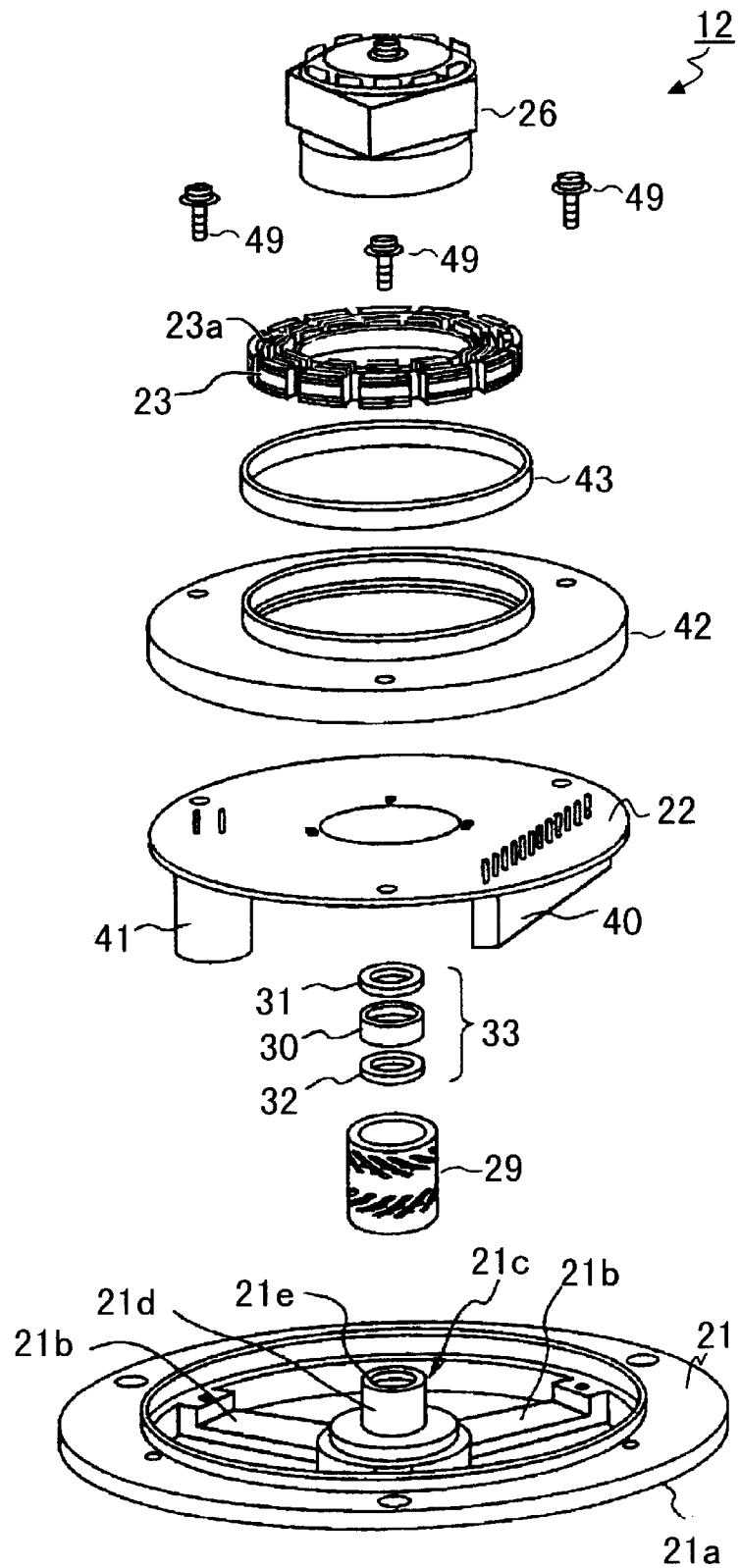
FIG. 8 is an exploded view illustrating a part of the structure of the polygonal mirror scanner motor drive apparatus of FIG. 7.

FIG. 7 is a schematic cross section view illustrating a structure of a motor drive apparatus for a polygonal mirror scanner motor 12 according to an embodiment of the present invention and FIG. 8 is an exploded view illustrating a part of the structure of the polygonal mirror scanner motor drive apparatus 12 of FIG. 7. With reference to FIG. 7 and FIG. 8, the polygonal mirror scanner motor drive apparatus 12 includes a housing 21 having a flange 21a for being mounted on an optical system of a laser printer (not shown). A printed circuit board 22 and a ferromagnetic stator core 23 winded with a field winding 23a (FIG. 8) mounted on a supporting member 42 are fixed inside the housing 21 by screws or an adhesive agent or the like. A ferromagnetic ring 43 fits to an outer surface of the ferromagnetic stator core 23. The ferromagnetic ring 43 improves a magnetic characteristic of the ferromagnetic stator core 23. Depending upon the specifications of the polygonal mirror scanner motor drive apparatus 12, the ferromagnetic ring 43 can be omitted. The field winding 23a connects to the printed circuit board 22 by a printed conductor on the printed circuit board 22. A Hall-effect device 24 (FIG. 7) is mounted on the printed circuit board 22 and wired by a printed conductor on the printed circuit board 22. A rotor 26 is mounted on a rotor magnet 27 (FIG. 7). The rotor magnet 27 faces the inner surface of the ferromagnetic stator core 23 wound with the field winding 23a in a direction perpendicular to the axis of rotation of the rotor 26. The motor 12 having the above-described structure is referred to as a radial air gap inner rotor brushless motor.

An outer circumferential periphery 22a and an inner circumferential periphery 22b of the printed circuit board 22 adhere tightly to the housing 21 to isolate and seal a chamber enclosing the rotor 26 together with a cover 39. The housing 21 has an integrally cast or molded bearing mount 21c and plural stiffening ribs 21b (FIG. 8) radially connecting the outer circumferential periphery thereof and the bearing mount 21c. A stationary tube 28 (FIG. 7) adheres closely to an outer circumferential surface 21d of the bearing mount 21c. The stationary tube 28 has a plurality of groves 28a, functioning as a dynamic air pressure bearing, on an outer circumferential surface thereof. The rotor 26 has a bearing tube 29 tightly fixed inside thereof and the bearing tube 29 loosely fits on the stationary tube 28. When the rotor 26 rotates, the air between the bearing tube 29 and the stationary tube 28 is compressed and the pressure of the air becomes high, and thereby the bearing tube 29 is radially floated without contacting the stationary tube 28, thereby the rotor 26 is radially floated.

A magnetic attraction axial bearing 5 is mounted inside the stationary tube 28 and on the top surface 21e (FIG. 8) of the bearing mount 21c. The magnetic attraction axial bearing 5 is constructed by a rotating member 35 having two flanges 35a and 35b and a stationary part 33 including a permanent magnet ring 30, a first ferromagnetic yoke 31, and a second ferromagnetic yoke 32. The first yoke 31 and the second yoke 32 are made of ferromagnetic material. Each of the yokes 31 and 32 is ring shaped and each internal diameter is smaller than that of the permanent magnet ring 30. The permanent magnet ring 30, the first yoke 31, and second yoke 32 are fixed on an internal wall of the stationary tube 28 by an elastic clamp 34 (FIG. 7) or an adhesive agent such that the permanent magnet ring 30 is concentrically sandwiched in the axial direction thereof between the first yoke 31 and the second yoke 32. The permanent magnet ring 30 can be made of rare earth permanent magnetic material. The first yoke 31 and the second yoke 32 can be made of an iron and steel system. The stationary tube 28 can be made of non-magnetic material.

The bearing tube 29 of the rotor 26 tightly mounts a flanged cap 36 thereon. A rotating member 35 of the magnetic attraction axial bearing 5 is press fitted into a hole of the flanged cap 36. The rotating member 35 of the magnetic attraction axial bearing 5 has the two flanges 35a and 35b formed on an outer circumferential surface of the rotating member 35. The rotating member 35 of the magnetic attraction axial bearing 5 can be made of permanent magnetic material, for example, ferromagnetic material such as an iron and steel system.

The flanges 35a and 35b face at a short distance the inner circumferential surfaces of the first yoke 31 and the second yoke 32, respectively. The permanent magnet ring 30 generates magnetic attraction forces at the air gap between the first yoke 31 and the first flange 35a and the air gap between the second yoke 32 and the second flange 35b, thereby the first flange 35a is attracted to the first yoke 31 and the second flange 35b is attracted to the second yoke 32.

The magnetic attraction axial bearing 5 is thus structured as follows. The rotor 26 is floated at a home position in the axial direction thereof where the weight of the rotor 26, including other elements attached thereon, counterbalances the magnetic attraction forces at the air gaps. Accordingly, when the rotor 26 is displaced by an external disturbance force from the home position in the axial direction, the rotor 26 is brought back to the home position by the magnetic attraction forces at the air gaps.

A polygonal mirror 37 is mounted on the flanged cap 36 and is fixed by a leaf spring 38 compressed by screws 49 that are fastened in threads formed in the rotating member 35. The flanged cap 36 has a small hole 36a which allows airflow therethrough such that viscosity of the air flowing through the small hole 36a damps an oscillation of the rotor 26 along the rotating axis thereof.

The cover 39 is formed like a cap to enclose the rotor 26 and has a glass window (not shown) which passes laser light through and a gap between the cover 39. The glass window is sealed up by an adhesive agent or a double-sided adhesive tape. When the polygonal mirror scanner motor drive apparatus 12 is installed in a sealed optical system of a laser printer, the cover 39 can be omitted.

A motor drive circuit 6 having driving devices 40, other circuit elements 41 and the Hall-effect device 24 are mounted on the printed circuit board 22. The motor drive circuit 6 switches the current running through the plurality of field windings 23a to generate a rotating magnetic field according to a position signal of the rotor 26 fed from the Hall-effect device 24 such that the rotor 26 rotates at a predetermined constant speed. The driving devices 40 of the motor drive circuit 6 are mounted outside the sealed chamber in which the rotor 26 is enclosed and between the plurality of stiffening ribs 21b. The driving devices 40 and the other circuit elements 41 are cooled by a fan (not shown) placed outside the polygonal mirror scanner motor drive apparatus 12. The motor drive circuit 6 can be separately placed from the DC motor 12 and connected to the printed circuit board 22 by a connector.

The rotor 26 can be balanced, for example, by drilling a small hole in or putting a small mass on a face 27a of the rotor magnet 27 or a face 37a of the polygonal mirror 37 in order to prevent a vibration caused by an imbalance of the rotor 26.

As described above, the motor drive apparatus and the method of the present invention are capable of decreasing electric power consumption and increasing safety during a stand-by state.

Furthermore, the motor drive apparatus of the present invention is capable of operating a motor for a predetermined period of time after receiving a stop signal and of decreasing electric power consumption and increasing safety in a stand-by state.

Furthermore, the motor drive apparatus of the present invention is capable of rapidly decreasing a rotating speed to stop the motor.

Furthermore, the motor drive apparatus of the present invention is capable of decreasing damages to a dynamic air pressure bearing of a motor.

Numerous additional modifications and variations of the present invention are possible in light of the above teachings. In particular, features described for certain embodiments may be employed in a logical manner to other embodiments described herein. It is therefore to be understood that within the scope of the appended claims, the present invention may be practiced otherwise than as specifically described herein.

What is claimed as new and desired to be secured by Letters Patents of the United States is:

1. A motor drive apparatus for driving a motor with power derived from a main power source, comprising:

a signal input device configured to input a start signal and a stop signal to initiate starting and stopping of the motor;

a voltage regulator configured to output regulated electric power to the motor; and a semiconductor switching device disposed between the main power source and the voltage regulator, coupled to the signal input device, and configured to switch electric power from the main power source to the voltage regulator in accordance with the start signal input from the signal input device, and to shut off the electric power to the voltage regulator in accordance with the stop signal input from the signal input device.

2. The motor drive apparatus according to claim 1, wherein the motor is a direct current brushless motor, comprising:

a position sensor configured to detect a rotating position of the motor and to receive the secondary electric power from the voltage regulator or the semiconductor switching device.

3. A motor drive apparatus for driving a motor with power derived from a main power source, comprising:

a signal input device configured to input a start signal and a stop signal to initiate starting and stopping of the motor;

a voltage regulator configured to output regulated electric power to the motor;

a first semiconductor switching device disposed between the main power source and the voltage regulator and coupled to the signal input device, said first semiconductor switching device including a control input and configured to switch electric power from the main power source to the voltage regulator; and a second semiconductor switching device, connected to the control input of the first semiconductor switching device, and configured to generate a turn-on signal in accordance with the start signal input from the signal input device and to generate a turn-off signal in accordance with the stop signal input from the signal input device;

wherein the first semiconductor switching device is configured to switch the electric power to the voltage regulator in accordance with the turn-on signal input from the second semiconductor switching device and to shut off the electric power to the voltage regulator in accordance with the turn-off signal input from the second semiconductor switching device.

4. The motor drive apparatus according to claim 3, wherein the motor is a direct current brushless motor, comprising:

a position sensor configured to detect a rotating position of the motor and to receive the secondary electric power from the voltage regulator or the first semiconductor switching device.

5. A motor drive apparatus for driving a motor with power derived from a main power source, comprising:

a signal input device configured to input a start signal and a stop signal to initiate starting and stopping of the motor;

a voltage regulator configured to output regulated electric power to the motor;

a first semiconductor switching device disposed between the main power source and the voltage regulator and coupled to the signal input device, said first semiconductor switching device including a control input and configured to switch electric power from the main power source to the voltage regulator;

a second semiconductor switching device connected to the control input of the first semiconductor switching device; and a timer device configured to generate a first timer signal at a first predetermined time after receiving the start signal input from the signal input device and to generate a second timer signal at a second predetermined time after receiving the stop signal input from the signal input device, the second predetermined time being longer than the first predetermined time;

wherein the second semiconductor switching device is configured to generate a turn-on signal in accordance with the first timer signal and to generate a turn-off signal in accordance with the second timer signal, and the first semiconductor switching device is configured to switch the electric power to the voltage regulator in accordance with the turn-on signal input from the second semiconductor switching device and to shut off the electric power to the voltage regulator in accordance with the turn-off signal input from the second semiconductor switching device.

6. The motor drive apparatus according to claim 5, wherein the motor is a direct current brushless motor, comprising:

a position sensor configured to detect a rotating position of the motor and to receive the secondary electric power from the voltage regulator or the first semiconductor switching device.

7. The motor drive apparatus according to claim 5, further comprising:

a slowdown circuit configured to decrease rotation of the motor in response to the stop signal.

8. The motor drive apparatus according to claim 7, wherein the motor includes a dynamic air pressure bearing and the slow down circuit is configured to decrease the rotation of the motor to a speed at which it can be determined whether the dynamic air pressure bearing is damaged.

9. The motor drive apparatus according to claim 5, wherein the timer device comprises:

a third semiconductor switching device configured to transmit the first timer signal and the second timer signal to the second semiconductor switching device;

a capacitor;

a discharging circuit configured to discharge the capacitor after the signal input device inputs the start signal; and a charging circuit configured to charge the capacitor after the signal input device inputs the stop signal.

10. A motor drive apparatus of a direct current motor having a main power source, comprising:

a position sensor configured to detect a rotating position of the direct current motor;

a motor control device configured to control the rotation of the direct current motor;

a signal input device configured to input a start signal and a stop signal to initiate starting and stopping of the direct current motor;

a voltage regulator configured to output regulated electric power to the motor control device and the position sensor; and a switching device disposed between the main power source and the voltage regulator, coupled to the signal input device, and configured to switch electric power from the main power source to the voltage regulator in accordance with the start signal input from the signal input device, and to shut off the electric power to the voltage regulator in accordance with the stop signal input from the signal input device.

11. The motor drive apparatus according to claim 10, wherein the motor control device is integrally structured inside the motor.

12. The motor drive apparatus according to claim 10, further comprising:

a slowdown circuit configured to stop rotation of the motor in response to the stop signal.

13. The motor drive apparatus according to claim 12, wherein the direct current motor includes a dynamic air pressure bearing and the slow down circuit is configured to decrease the rotation of the motor to a speed at which it can be determined whether the dynamic air pressure bearing is damaged.

14. A method for driving a motor with power derived from a main power source, comprising:

inputting start signals and stop signals to initiate starting and stopping of the motor;

supplying electric power input from the main power source to a voltage regulator configured to apply regulated power to the motor in accordance with a respective start signal input from the signal input device; and shutting off the electric power from the main power source to the voltage regulator in accordance with a respective stop signal input from the signal input device.

15. A method for driving a motor from power derived from a main power source, comprising:

inputting start signals and stop signals to initiate starting and stopping of the motor;

supplying electric power input from the main power source to a voltage regulator configured to apply regulated power to the motor in accordance with a respective start signal input from the signal input device;

shutting off the electric power input from the main power source to the voltage regulator a predetermined time after receiving a respective stop signal; and stopping rotation of the motor when the respective stop signal is received.

* * * * *